No. 722,939. PATENTED MAR. 17, 1903.
O. BERGSTROM.
APPARATUS FOR MOLDING PIPE.
APPLICATION FILED FEB. 20, 1902.
NO MODEL. 2 SHEETS—SHEET 1.
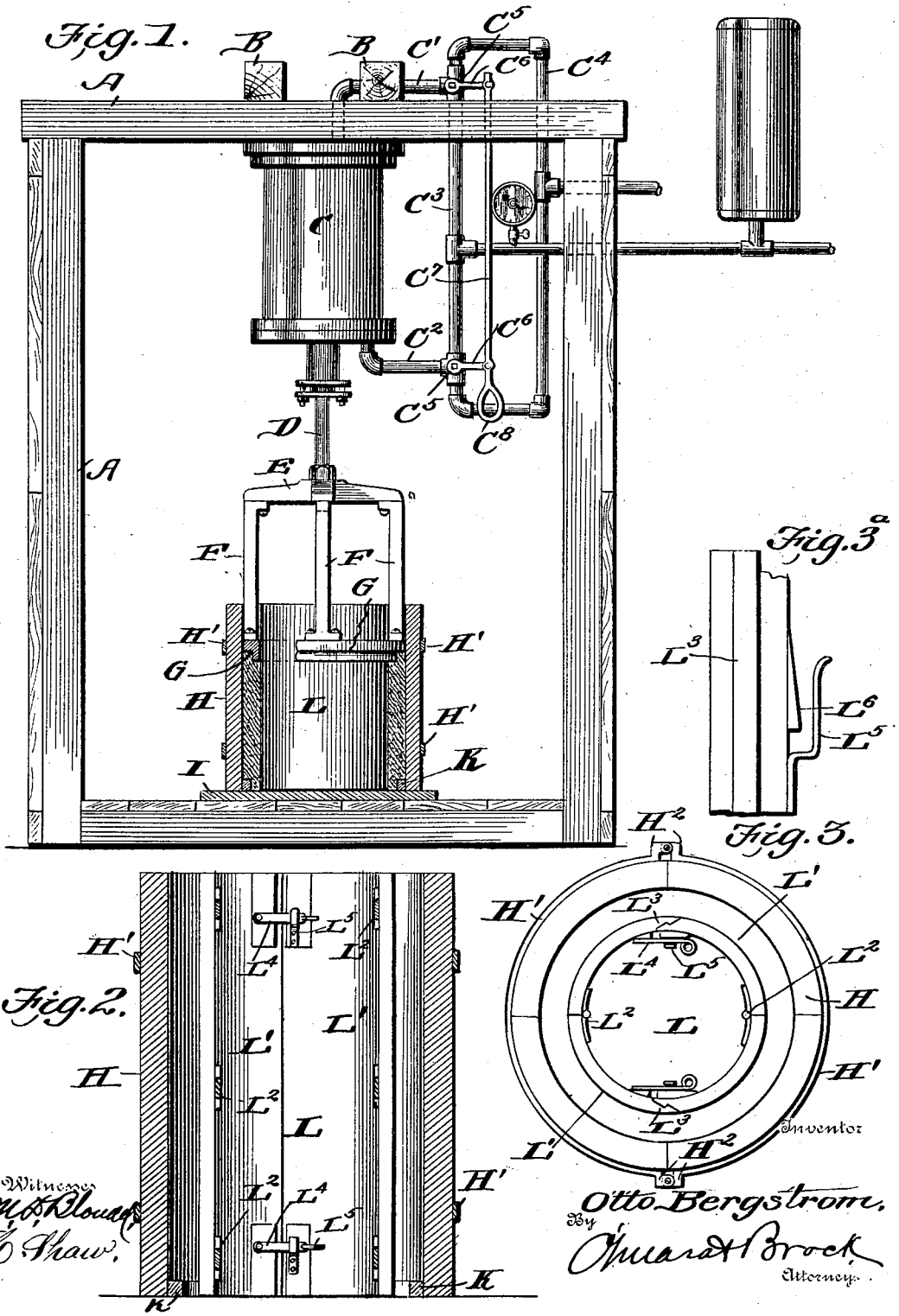

No. 722,939. PATENTED MAR. 17, 1903.
O. BERGSTROM.
APPARATUS FOR MOLDING PIPE.
APPLICATION FILED FEB. 20, 1902.
NO MODEL. 2 SHEETS—SHEET 2.
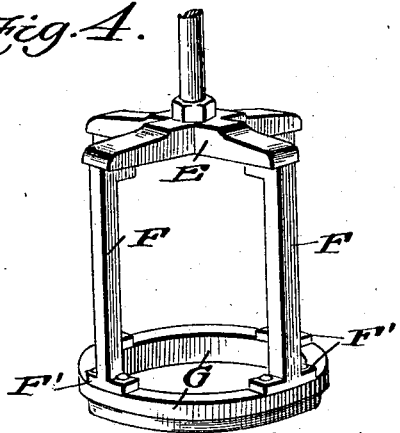
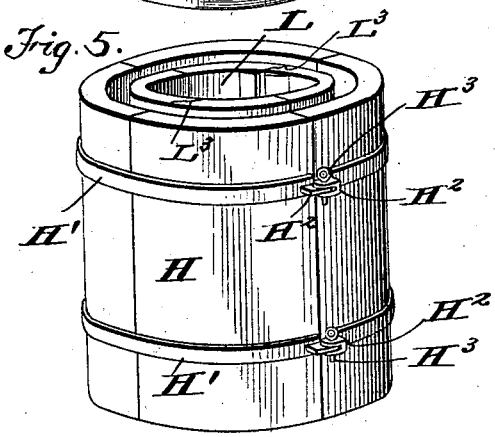
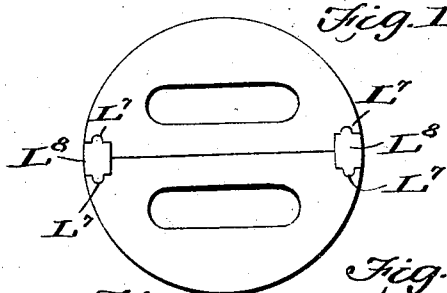
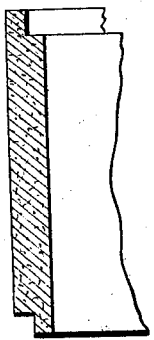 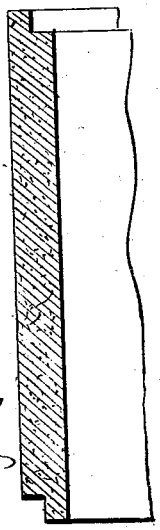 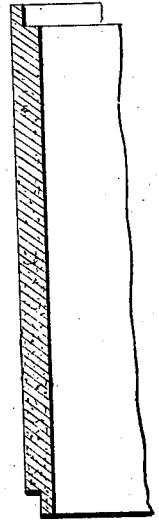
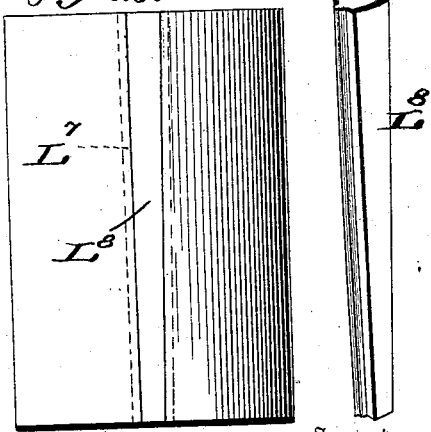
Inventor
Otto Bergstrom,

UNITED STATES PATENT OFFICE.

OTTO BERGSTROM, OF AUSTIN, TEXAS.

APPARATUS FOR MOLDING PIPE.

SPECIFICATION forming part of Letters Patent No. 722,939, dated March 17, 1903.

Application filed February 20, 1902. Serial No. 94,958. (No model.)

*To all whom it may concern:*

Be it known that I, OTTO BERGSTROM, a citizen of the United States, residing at Austin, in the county of Travis and State of Texas, have invented a new and useful Apparatus for Molding Pipe, of which the following is a specification.

This invention is an improved apparatus for molding pipe, the object of the invention being to provide a cheap, simple, and efficient apparatus by means of which pipes of different sizes can be molded and also an apparatus by means of which pipe-sections can be molded.

Another object of the invention is to provide a core or former which can be quickly and easily set up and taken apart, thereby facilitating the quick and easy molding of the pipe.

With these various objects in view the invention consists in the novel features of construction and combination, all of which will be fully described hereinafter and pointed out in the claims.

In the drawings forming part of this specification, Figure 1 is a view partly in elevation and partly in section and illustrating an apparatus constructed in accordance with my invention. Fig. 2 is a vertical sectional view of the mold and core. Fig. 3 is a top plan view. Fig. 3$^a$ is a detail sectional view illustrating the wedging action of the latch connection between the sections of the core. Fig. 4 is a detail perspective view of the plunger. Fig. 5 is a detail perspective view of the mold and core located therein. Figs. 6, 7, and 8 are detail sectional views illustrating the different sizes and thickness of pipe which can be molded. Figs. 9 and 10 are detail views showing a plunger-section employed when pipe-sections are molded. Fig. 11 is a top plan view of a modified form of core. Fig. 12 is a side view of the same. Fig. 13 is a detail perspective view of the connecting wedge-strip.

In carrying out my invention I employ a suitable framework A, upon which are arranged the timbers B for the purpose of supporting a cylinder C, which has the piston working therein and operated by steam, water, or compressed air, as preferred. C' and C$^2$ indicate pipes which connect with the upper and lower ends, respectively, of the cylinder C, said pipes C' and C$^2$ being connected with the supply-pipe C$^3$ and also with the exhaust-pipe C$^4$, the valves C$^5$ being arranged at the juncture of said pipes, so that as the operating fluid is led into the cylinder at one end the exhaust can pass from the opposite end. In order to operate these valves alternately in opposite directions, I provide the stems C$^6$, which are connected by a rod C$^7$, having a handle C$^8$, so that when the steam or water is turned into the upper end of the cylinder the lower valve C$^5$ is open to permit the exhaust steam or water to pass from the bottom of the cylinder, and at the same time the entrance of steam or water through the valve C$^5$ is cut off. The piston has a rod D working through the bottom of the cylinder and is provided with a spider E at its lower end, and to the outer end of each spider-arm is rigidly attached a depending bar F, having laterally-projecting lugs or feet F', by means of which the bars F are rigidly connected to the plunger-ring G.

H indicates the mold, preferably made in sections held together by the bands H', the ends of which have perforated interlocking ears H$^2$, through which pins H$^3$ are passed, thereby securely locking the mold together. This mold rests upon a base I, and within the mold and resting also upon the base is a ring K, the purpose of which is to produce the shoulder upon the lower end of the pipe. The former L, which is arranged centrally within the mold and rests upon the base, is cylindrical in form and consists of two interlocking sections L', each section L' being divided longitudinally and connected by means of a hinge L$^2$. The edges of the sections L' are formed with interlocking oblique shoulder edges L$^3$, so constructed that the said edges can be readily forced one beyond the other, if so desired, or they can be readily brought into conjunction by a swinging or pivot movement. One of the sections has latches L$^4$, pivoted upon the interior adjacent to the outer edge, and the opposing section has keepers L$^5$, adapted for engagement with the said latches, and the wedge L$^6$ is arranged in alinement with the keeper L$^5$, so that as the latch is forced down into the keeper it will be caused to bind thereagainst by means of the wedge, and thereby securely lock the sections.

In Figs. 11 and 12 I have illustrated a modified form of former, in which the sections are provided with opposing grooves $L^7$, in which fit the wedge-shaped connecting-strips $L^8$, thereby securely connecting the sections of the former.

In operation the mold is arranged upon the base, the former set in place, and the material to be molded placed within the mold about the former. The plunger is then operated to compress the material in the mold and is retained there a sufficient length of time to thoroughly compress and set the material. By reversing the valves the plunger is withdrawn and the parts of the mold can be separated and the pipe removed therefrom.

It will thus be seen that I provide an exceedingly cheap, simple, and efficient device for molding pipes, and it will be readily understood that pipes of various sizes and thickness can be molded, and it will also be understood that sections of pipe can be made by simply subdividing the mold by suitable division-plates.

Having thus fully described my invention, what I claim as new, and desire to secure by Letters Patent, is—

1. In a device of the kind described, the combination with a base and mold, of a former or core arranged upon said base and within the mold, a plunger-ring adapted to work in the said mold, the arms carrying the plunger-ring, the spider to which the arms are attached, and the piston-rod to which the spider is connected, substantially as described.

2. In an apparatus of the kind described, the combination with a main frame, of a cylinder connected therewith, and provided with inlet and exhaust pipes and valves and operating means for controlling the inlet and exhaust of the operating fluid, the downwardly-extending piston-rod, the spider rigidly attached to the lower end of said rod, the arms connected to the outer ends of the spider, the plunger-ring attached to the depending arms, the mold, and the separable core or former arranged within the mold, substantially as shown and described.

3. In an apparatus for molding pipe, the combination with a cylinder, of a piston, a piston-rod, a mold beneath the cylinder, an interchangeable disk, upright standards secured to said disk, cross-pieces connecting said standards, said cross-pieces being secured at the point of intersection to the piston-rod.

OTTO BERGSTROM.

Witnesses:
R. M. ARMSTRONG,
F. M. COVERT.